(12) United States Patent
Huang et al.

(10) Patent No.: US 8,111,786 B2
(45) Date of Patent: Feb. 7, 2012

(54) SIGNAL CONVERTERS

(75) Inventors: Ho-Chi Huang, Hsinchu County (TW); Ting-Che Tseng, Hsinchu (TW); Chin-Yang Hsieh, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 828 days.

(21) Appl. No.: 12/137,174

(22) Filed: Jun. 11, 2008

(65) Prior Publication Data

US 2009/0310717 A1  Dec. 17, 2009

(51) Int. Cl.
*H04L 27/06* (2006.01)
(52) U.S. Cl. ........ 375/340; 375/324; 375/316; 375/322; 375/343
(58) Field of Classification Search ............ 375/340, 375/324, 316
See application file for complete search history.

(56) References Cited

U.S. PATENT DOCUMENTS

| | | | |
|---|---|---|---|
| 6,370,133 B1 * | 4/2002 | Kang et al. | 370/342 |
| 6,567,480 B1 * | 5/2003 | Brardjanian et al. | 375/331 |
| 6,856,794 B1 | 2/2005 | Tso et al. | |
| 7,120,415 B2 * | 10/2006 | Minnis et al. | 455/324 |
| 2002/0181614 A1 * | 12/2002 | Mostafa et al. | 375/316 |
| 2003/0174783 A1 * | 9/2003 | Rahman et al. | 375/298 |
| 2005/0096004 A1 * | 5/2005 | Tso et al. | 455/334 |
| 2007/0287402 A1 * | 12/2007 | Feng et al. | 455/323 |
| 2009/0115651 A1 * | 5/2009 | Hoang et al. | 341/141 |

* cited by examiner

*Primary Examiner* — Kenneth Lam
(74) *Attorney, Agent, or Firm* — Thomas|Kayden

(57) ABSTRACT

A signal converter. The signal converter converts an analog inphase signal and an analog quadrature phase signal into a digital baseband inphase signal and a digital baseband quadrature phase signal. The analog inphase signal and the analog quadrature phase signal are orthogonal to each other and are carried in a predetermined intermediate frequency. The digital baseband inphase signal and the digital baseband quadrature phase signal are carried in zero frequency. The signal converter comprises a signal combiner combining the analog inphase signal and the analog quadrature phase signal to obtain an analog combined signal, an analog to digital converter converting the analog combined signal to a digital combined signal, and a signal separator separating the digital combined signal to obtain the digital baseband inphase signal and the digital baseband quadrature phase signal.

24 Claims, 19 Drawing Sheets

SIGNAL CONVERTERS

BACKGROUND OF THE INVENTION

1. Field of the Invention

The invention relates to a signal converter, and more particularly, to a signal converter with only one ADC (analog to digital converter) in a radio frequency receiver.

2. Description of the Related Art

In wireless communication systems, information is transmitted over radio frequency (RF) communication channels that are established between terminals. Each terminal includes radio frequency receiver circuitry used to select signals of a desired communication channel, to down convert the selected radio frequency signals to baseband digital signals for further digital signal processing.

In the RF receiver, frequency down conversion may be designed by a number of different technologies, wherein the most popular are direct conversion and intermediate frequency (IF) conversion technologies. In a direct conversion RF receiver, also called a zero-IF receiver, the signal of interest is converted directly to a zero frequency carrier. In a low IF RF receiver, the signal of interest is converted to an intermediate frequency carrier near the zero frequency. Additionally, super-heterodyne is also a well known technology to convert an RF signal to a baseband digital signal via several intermediate stages.

Once the signal of interest is converted to a baseband signal or low-IF signal, digitalization will then be performed to convert the analog signal into digital signals. Next, the digital signals will be further processed for channel filtering, channel estimating, the signal demodulating, the signal decoding, quality estimating and so on.

Usually, for a communication system with data transmitted by inphase (I) and quadrature phase (Q) signal components, two ADCs are required for each of the inphase signal component and the quadrature phase signal component to sample the analog I and Q phase component into digital format. However, the use of two ADCs requires more die area, more die cost, and more power consumption. Thus, a novel RF receiver architecture with a more efficient hardware design should be provided.

BRIEF SUMMARY OF THE INVENTION

Signal converters are provided. An exemplary embodiment of such a signal converter converts an analog inphase signal and an analog quadrature phase signal into a digital baseband inphase signal and a digital baseband quadrature phase signal. The analog inphase signal and the analog quadrature phase signal are orthogonal to each other and are carried in a predetermined intermediate frequency. The digital baseband inphase signal and the digital baseband quadrature phase signal are carried in zero frequency. The signal converter comprises a signal combiner combining the analog inphase signal and the analog quadrature phase signal to obtain an analog combined signal, an analog to digital converter converting the analog combined signal to a digital combined signal, and a signal separator separating the digital combined signal to obtain the digital baseband inphase signal and the digital baseband quadrature phase signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
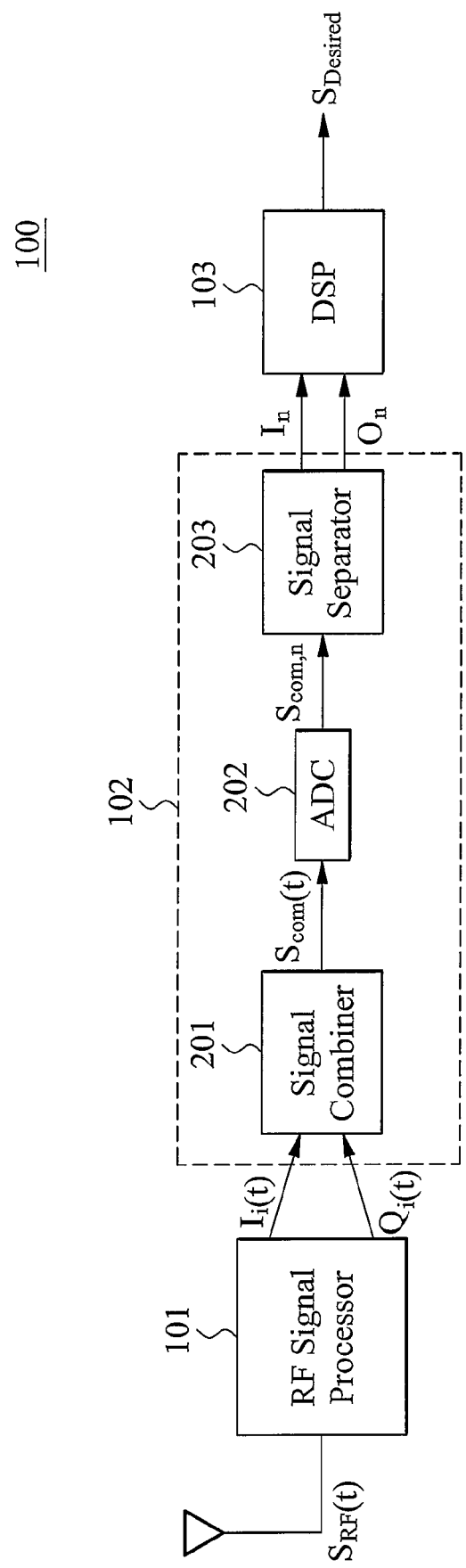
FIG. 1 shows a block diagram of a low intermediate frequency radio frequency receiver according to an embodiment of the invention.

FIG. 1 shows a block diagram of a low intermediate frequency radio frequency receiver (low-IF RF receiver) 100 according to an embodiment of the invention. As shown in FIG. 1, the low-IF RF receiver 100 comprises an RF signal processor 101, a signal converter 102, and a digital signal processing (DSP) module 103. The RF signal processor 101 down converts the frequency of an analog RF signal $S_{RF}(t)$ received from an antenna, and obtains an analog inphase signal $I_i(t)$ and the analog quadrature phase signal $Q_i(t)$. The analog RF signal $S_{RF}(t)$ is carried in a predetermined radio frequency, wherein the predetermined radio frequency may vary with different communication systems. For example, in a global system for mobile communication (GSM), the radio frequency is 900 MHz or 1800 MHz. For another example, in a Bluetooth application, the radio frequency is 2.4 GHz. The RF signal processor 101 down converts the radio frequency of the analog RF signal $S_{RF}(t)$ to a predetermined intermediate frequency near the zero frequency, such as twice or triple of the transmission bandwidth of a specific communication system. The outputted analog inphase signal $I_i(t)$ and the analog quadrature phase signal $Q_i(t)$ are thus carried in the predetermined intermediate frequency and are orthogonal to each other.

Next, the signal converter 102 receives the analog inphase signal $I_i(t)$ and the analog quadrature phase signal $Q_i(t)$, and further converts them into two digital baseband signals. The signal converter 102 comprises a signal combiner 201, an analog to digital converter (ADC) 202, and a signal separator 203. The signal combiner 201 combines the analog inphase signal $I_i(t)$ and the analog quadrature phase signal $Q_i(t)$, to obtain an analog combined signal $S_{com}(t)$. According to an embodiment of the invention, the signal combiner is simply an adder directly adding the analog inphase signal $I_i(t)$ and the analog quadrature phase signal $Q_i(t)$ to obtain the analog combined signal $S_{com}(t)$. According to another embodiment of the invention, the signal combiner can be an image rejection mixer to combine the analog inphase signal $I_i(t)$ and the analog quadrature phase signal $Q_i(t)$ and obtains the analog combined signal $S_{com}(t)$. After obtaining the analog combined signal $S_{com}(t)$, the ADC 202 converts it to a digital combined signal $S_{com,n}$. Next, the signal separator 203 separates the digital combined signal $S_{com,n}$ to obtain the digital baseband inphase signal $I_n$ and the digital baseband quadrature phase signal $Q_n$, wherein the digital baseband inphase signal $I_n$ and digital baseband quadrature phase signal $Q_n$ are carried in zero frequency and are the digital version of the signal of interest. Finally, the DSP module 103 performs a plurality signal processing on the signal of interest, such as signal de-interleaving, demodulation, decoding, etc, to recover the desired signal $S_{Desired}$.

Figure 2A:
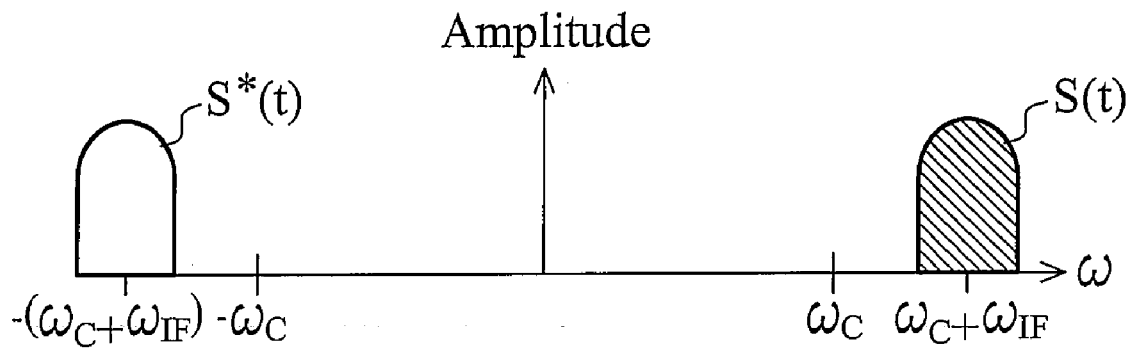
FIG. 2A shows the spectrum of the analog RF signal.
Figure 2B:
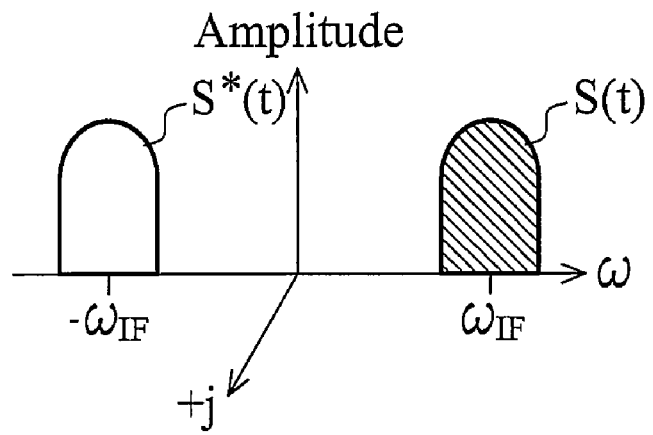
FIG. 2B shows the spectrum of the analog inphase signal.
Figure 2C:
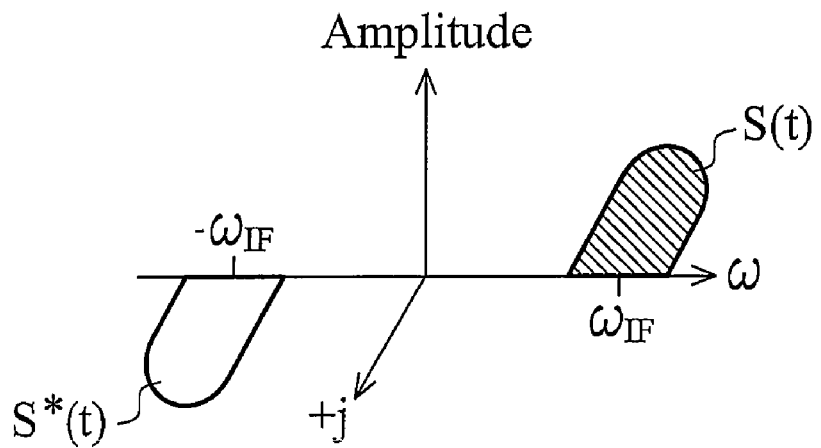
FIG. 2C shows the spectrum of the analog quadrature phase signal.

FIG. 2A illustrates the spectrum of an analog RF signal $S_{RF}(t)$. Assuming the analog version of the signal of interest is given as $S(t)=I(t)+jQ(t)$ and is carried in frequency $(w_c+w_{IF})$, wherein $I(t)$ is the real part and $Q(t)$ is the imaginary part of the signal $S(t)$, the signal received at the low-IF RF receiver 100 is given as:

$$S_{RF} = \text{Re}\{S(t) \times e^{j(\omega_c + \omega_{IF})t}\} \quad \text{Eq. (1)}$$

$$= \frac{1}{2}S(t)e^{j(\omega_c+\omega_{IF})t} + \frac{1}{2}S^*(t)e^{-j(\omega_c+\omega_{IF})t}$$

wherein $S^*(t)$ is the complex conjugate of $S(t)$. Thus, as shown in FIG. 2A, the spectrum of the analog RF signal $S_{RF}(t)$ contains the spectrum component of $S(t)$ in positive frequency $w_c+w_{IF}$ and the spectrum component of its complex conjugate $S^*(t)$ in negative frequency $-(w_c+w_{IF})$. After being processed in the RF signal processor 101, the analog RF signal will be down converted to frequency $w_{IF}$ and separated into two orthogonal signals $I_i(t)$ and $Q_i(t)$. FIGS. 2B-2C respectively show the spectrum of signals $I_i(t)$ and $Q_i(t)$. As can be seen, both of the spectrums contain the spectrum component of $S(t)$ in positive frequency $w_{IF}$ and the spectrum component of its complex conjugate $S^*(t)$ in negative frequency $-w_{IF}$. However, it should be noted that since the analog inphase signal $I_i(t)$ and the analog quadrature phase signal $Q_i(t)$ are orthogonal to each other, there is a 90 degree phase difference between them, as shown in the j-axis.

Figure 2D:
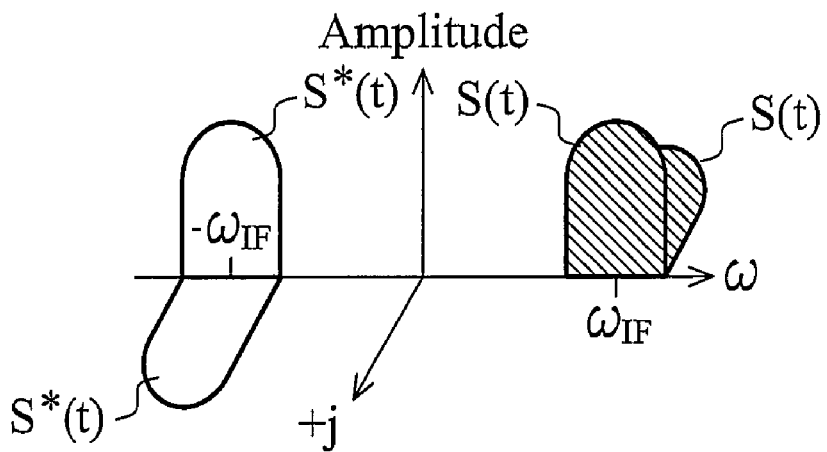
FIG. 2D shows the spectrum of the analog combined signal.

Referring to FIG. 1, the signal combiner 201 combines the analog inphase signal $I_i(t)$ and the analog quadrature phase signal $Q_i(t)$ to obtain an analog combined signal $S_{com}(t)$. FIG. 2D shows the spectrum of the analog combined signal $S_{com}(t)$. As shown in FIG. 2D, the analog combined signal $S_{com}(t)$ is obtained by directly adding the analog inphase signal $I_i(t)$ and the analog quadrature phase signal $Q_i(t)$. Thus, the spectrum components of $S_{com}(t)$ are the combination of the frequency components shown in FIGS. 2B and 2C. After obtaining the analog combined signal $S_{com}(t)$, the ADC 202 converts it to a digital combined signal $S_{com,n}$, where n represents a sample index. It is well known to those skilled in the art that in the sampling process for digitalication, the analog signal spectrum is effectively shifted to both sides of the spectrum by multiples of the sampling frequency. Thus, for the sake of brevity, the discussion and drawing of the duplication of the shifted spectrums are omitted.

After digitalization, the signal separator 203 separates the digital combined signal $S_{com,n}$ to obtain the digital baseband inphase signal $I_n$ and the digital baseband quadrature phase signal $Q_n$. According to an embodiment of the invention, the signal separator 203 diverges the digital combined signal to a first signal processing path and a second signal processing path, translates and filters the digital combined signal on the first signal processing path and the second signal processing path, respectively, and combines a plurality of data on the first signal processing path and the second signal processing path to obtain the digital baseband inphase signal $I_n$ and the digital baseband quadrature phase signal $Q_n$. According to an embodiment of the invention, the frequency translation in the first signal processing path is performed according to a first reference signal, and the frequency translation in the second signal processing path is performed according to a second reference signal, wherein the first reference signal and the second reference signal are orthogonal to each other. According to another embodiment of the invention, the frequency translation in the first signal processing path is performed according to a first reference signal, and the frequency translation in the second signal processing path is performed according to a second reference signal, wherein the first reference signal and the second reference signal are carried in the predetermined intermediate frequency.

Figure 3:
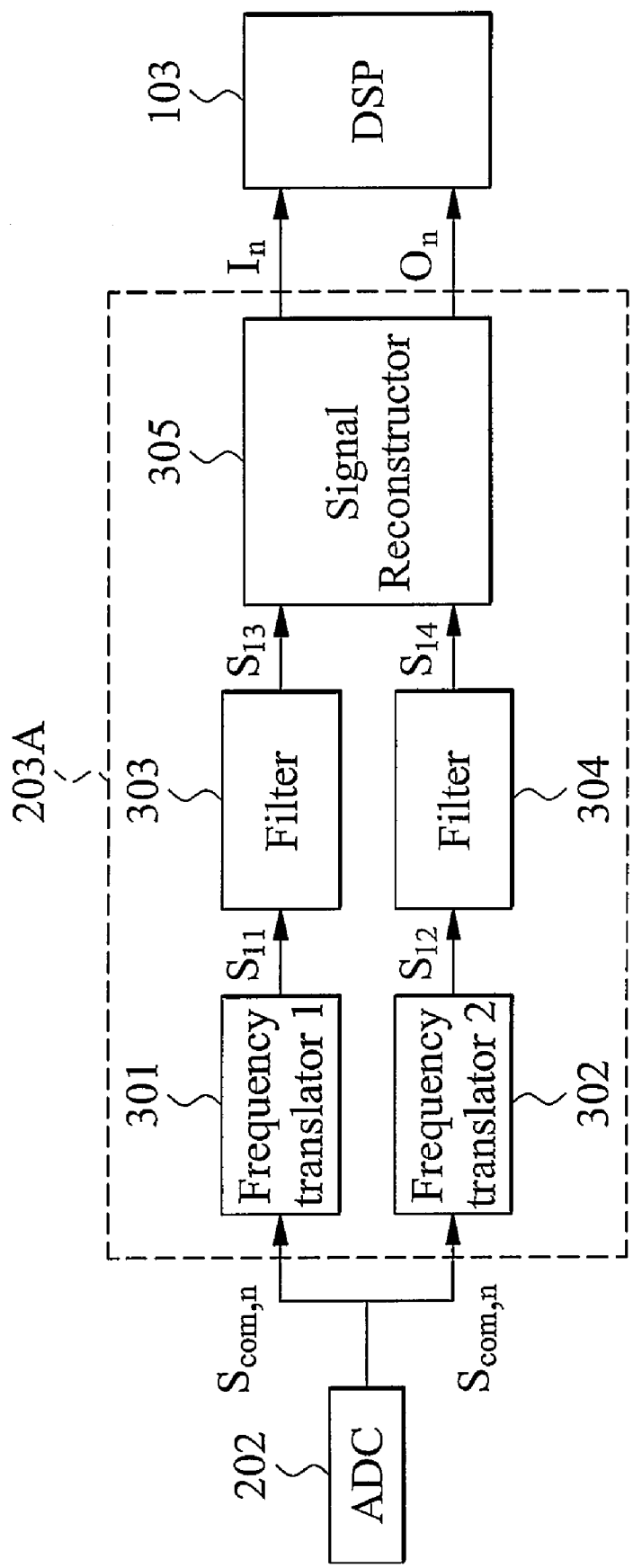
FIG. 3 shows an exemplary block diagram of a signal separator according to the embodiment of invention.

FIG. 3 shows an exemplary block diagram of a signal separator according to the embodiment of invention. As shown in FIG. 3, the signal separator 203A comprises two frequency translators 301 and 302, and two filters 303 and 304 disposed on two signal processing paths (shown as the upper path and the lower path in FIG. 3), and a signal reconstructor 305. Frequency translator 301 translates the digital combined signal $S_{com,n}$ into a first translated signal $S_{11}$. Frequency translator 302 translates the digital combined signal $S_{com,n}$ into a second translated signal $S_{12}$. According to an embodiment of the invention, the frequency translators 301 and 302 can be implemented as correlators or mixers to translate the digital combined signal according the first and second reference signals.

Figure 4A:
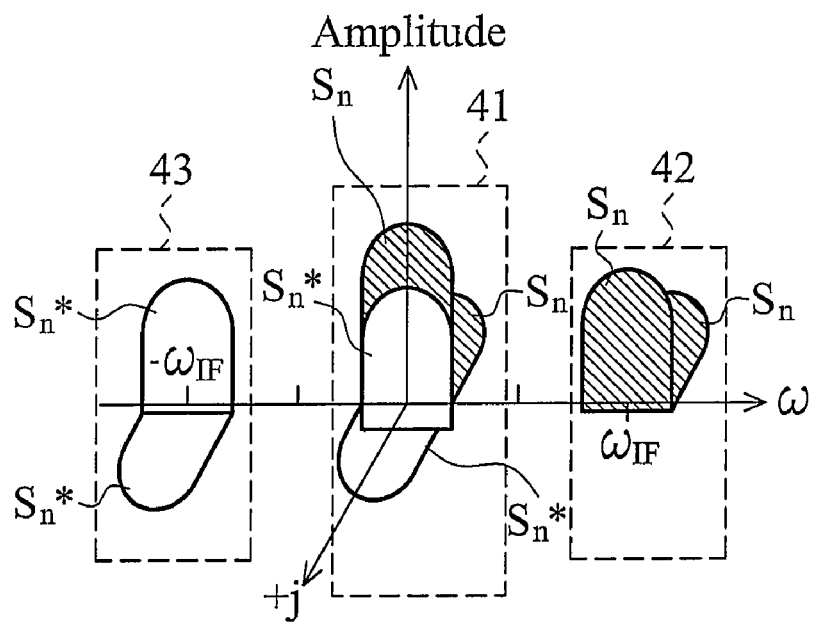
FIG. 4A shows the spectrum of a first translated signal $S_{11}$ according to an embodiment of invention.
Figure 4B:
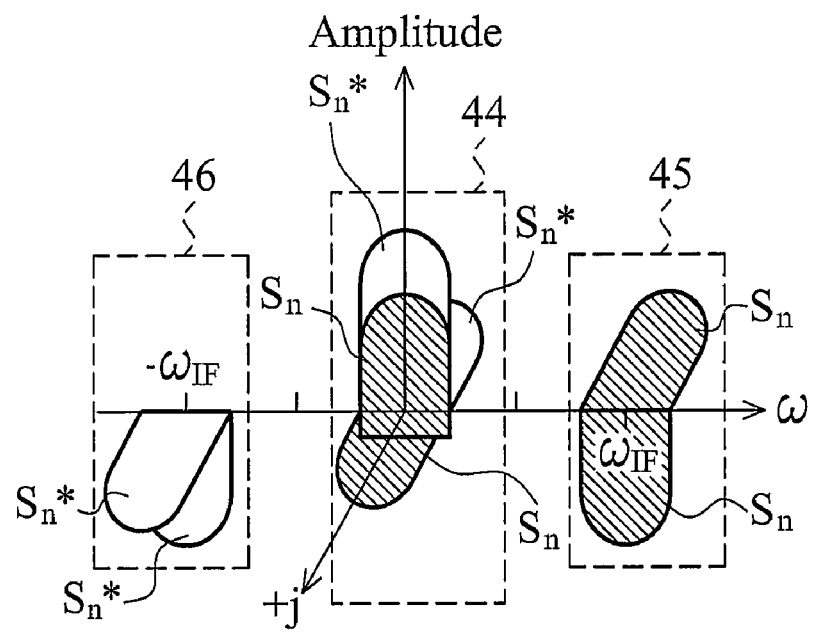
FIG. 4B shows the spectrum of a second translated signal $S_{12}$ according to an embodiment of invention.

FIGS. 4A-4B respectively show the spectrum of a first translated signal $S_{11}$ and the second translated signal $S_{12}$. As shown in FIG. 4A, the first translated signal $S_{11}$ comprises first baseband component 41 carried in the zero frequency and first high frequency components 42 and 43 carried in the frequency other than zero frequency, wherein $S_n$ represents the digital version of the signal S(t) and $S^*_n$ represents the digital version of the signal S*(t). Similarly, as shown in FIG. 4B, second translated signal $S_{12}$ comprises second baseband component 44 carried in the zero frequency and second high frequency components 45 and 46 carried in the frequency other than zero frequency. Referring to FIG. 3, the first translated signal $S_{11}$ and the second translated signal $S_{12}$ are then passed into filters 303 and 304. According to an embodiment of the invention, filters 303 and 304 can be low pass filters to filter out the unwanted high frequency components of the first translated signal $S_{11}$ and the second translated signal $S_{12}$. Thus, the filter 303 receives the first translated signal $S_{11}$, filters out the first high frequency components 42 and 43, and outputs a first filtered signal $S_{13}$ comprising the first baseband component 41. Similarly, the filter 304 receives the second translated signal $S_{12}$, filters out the second high frequency component 45 and 46, and outputs a second filtered signal $S_{14}$ comprising the second baseband component 44.

Figure 4C:
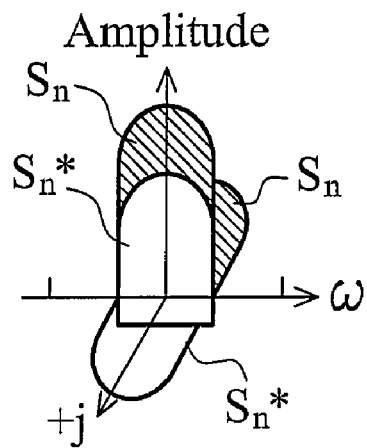
FIG. 4C shows the spectrum of a first filtered signal $S_{13}$ according to an embodiment of invention.
Figure 4D:
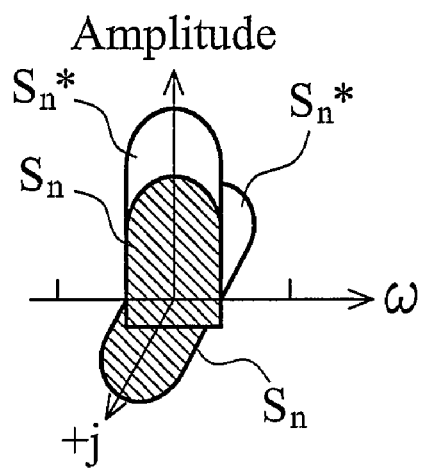
FIG. 4D shows the spectrum of a second filtered signal $S_{14}$ according to an embodiment of invention.
Figure 4E:
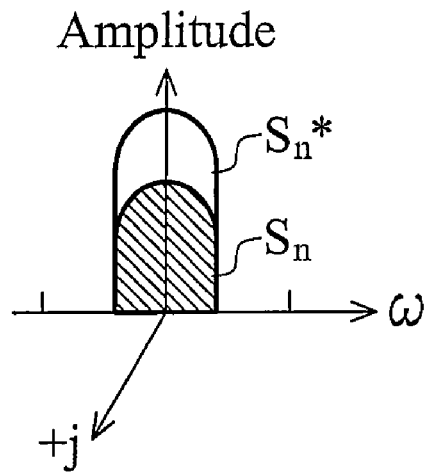
FIG. 4E shows the spectrum of the digital baseband inphase signal $I_n$ outputted from the signal reconstructor.
Figure 4F:
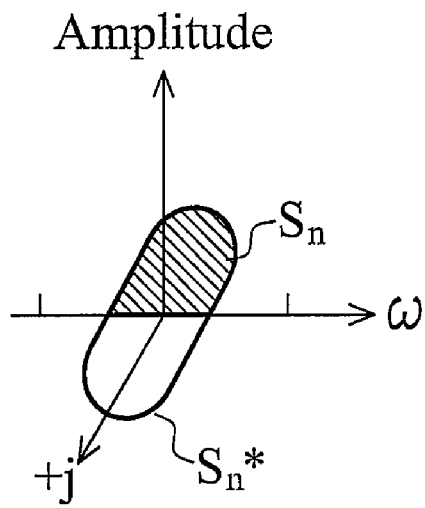
FIG. 4F shows the spectrum of the digital baseband quadrature phase signal $Q_n$ outputted from the signal reconstructor.

FIGS. 4C-4D respectively show the spectrum of a first filtered signal $S_{13}$ and second filtered signal $S_{14}$. As shown in FIG. 4C, first filtered signal $S_{13}$ comprises the first baseband component 41 and comprises no high frequency components. Similarly, as shown in FIG. 4D, the second filtered signal $S_{14}$ comprises the second baseband component 44 and comprises no high frequency components. Finally, the signal reconstructor 305 generates the digital baseband inphase signal $I_n$ and the digital baseband quadrature phase signal $Q_n$ according to the first filtered signal $S_{13}$ and the second filtered signal $S_{14}$. According to an embodiment of the invention, the digital baseband inphase signal $I_n$ and the digital baseband quadrature phase signal $Q_n$ are generated by simply using adders to combine the first filtered signal $S_{13}$ and the second filtered signal $S_{14}$. FIGS. 4E-4F respectively show the spectrum of the digital baseband inphase signal $I_n$ and the digital baseband quadrature phase signal $Q_n$ outputted from the signal reconstructor 305. As shown in FIG. 4E, the signal reconstructor 305 eliminates the quadrature phase components in the first filtered signal $S_{13}$ by combining the first filtered signal $S_{13}$ and the second filtered signal $S_{14}$. As a result, the outputted signal only contains the frequency components of $S_n$ and $S^*_n$ in zero frequency. Apparently, since $$S_n + S^*_n = (I_n + jQ_n) + (I_n - jQ_n) = 2I_n \qquad \text{Eq., (2)}$$

the signal of interest $I_n$ is thus obtained. Similarly, as shown in FIG. 4F, the signal reconstructor 305 eliminates the inphase components in the second filtered signal $S_{14}$ by combining the first filtered signal $S_{13}$ and the second filtered signal $S_{14}$. As a result, the outputted signal only contains the frequency components of $S_n$ and $S^*_n$ in zero frequency. Since $$j(-jS_n + jS^*_n) = j[(-jI_n + Q_n) + (jI_n + Q_n)] = 2jQ_n \qquad \text{Eq., (3)}$$

the signal of interest $Q_n$ is thus obtained.

It should be noted that according to the embodiments of the invention, the process order of frequency translating, filtering, and signal construction can be varied while achieving the same results and the invention is not limited thereto. For example, FIG. 5 shows another exemplary block diagram of a signal separator according to the embodiment of invention.

Figure 5:
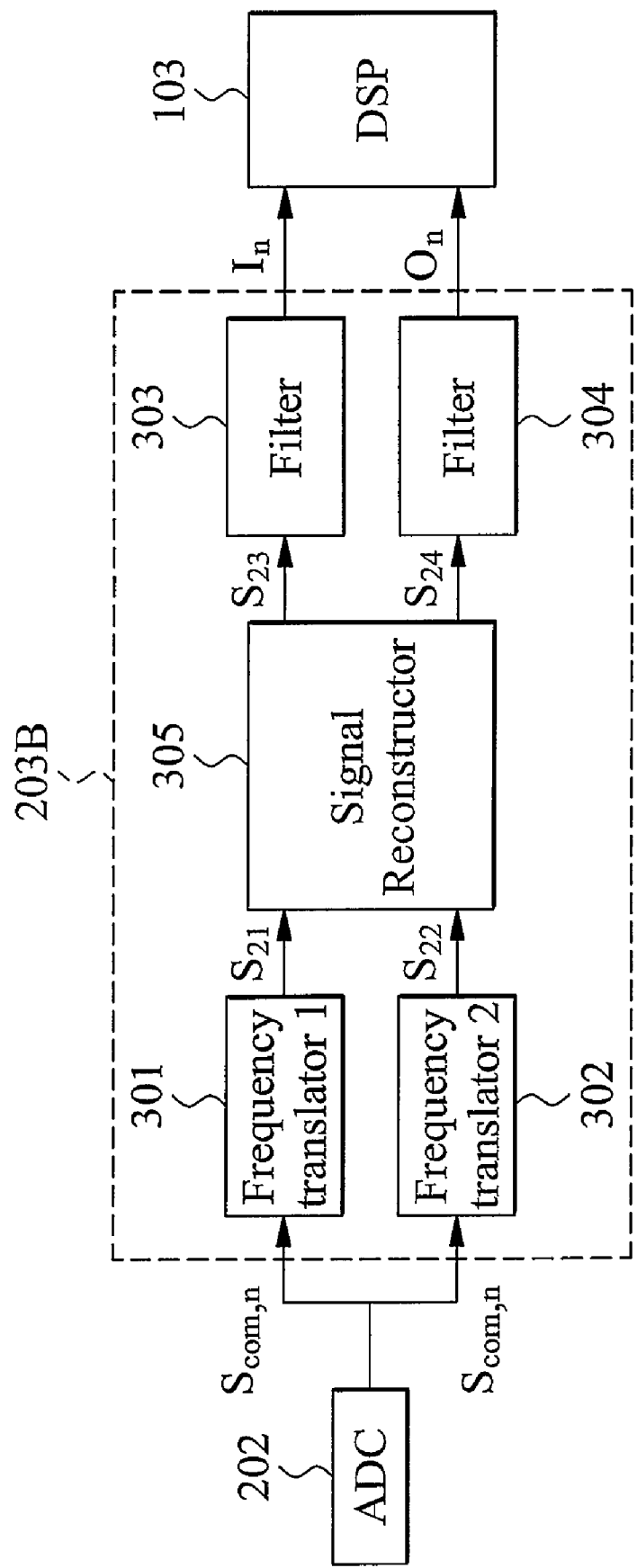
FIG. 5 shows another exemplary block diagram of a signal separator according to the embodiment of invention.

As shown in FIG. 5, the signal separator 203B comprises the same elements as signal separator 203A in FIG. 3, but the process order between the signal reconstructor 305 and the filters 303 and 304 has been changed. Frequency translator 301 translates the digital combined signal $S_{com,n}$ into a first translated signal $S_{21}$. Frequency translator 302 translates the digital combined signal $S_{com,n}$ into a second translated signal $S_{22}$. The signal reconstructor 305 generates a first reconstructed signal $S_{23}$ and a second reconstructed signal $S_{24}$ according to the first translated signal $S_{21}$ and the second translated signal $S_{22}$, wherein the first reconstructed signal $S_{23}$ comprises first high frequency components and the first baseband component carried in the zero frequency, and the second reconstructed signal $S_{24}$ comprises second high frequency components and the second baseband component carried in the zero frequency. The frequency spectrums of the first reconstructed signal $S_{23}$ and the second reconstructed signal $S_{24}$ can be easily derived according to FIGS. 4A-4F and thus will not be further discussed for brevity. Next, the filter 303 receives the first reconstructed signal $S_{23}$, filters out the first high frequency component, and outputs the digital baseband inphase signal $I_n$ according to the first baseband component. Similarly, the filter 304 receives the second reconstructed signal $S_{24}$, filters out the second high frequency component, and outputs the digital baseband quadrature phase signal $Q_n$ according to the second baseband component.

Figure 6:
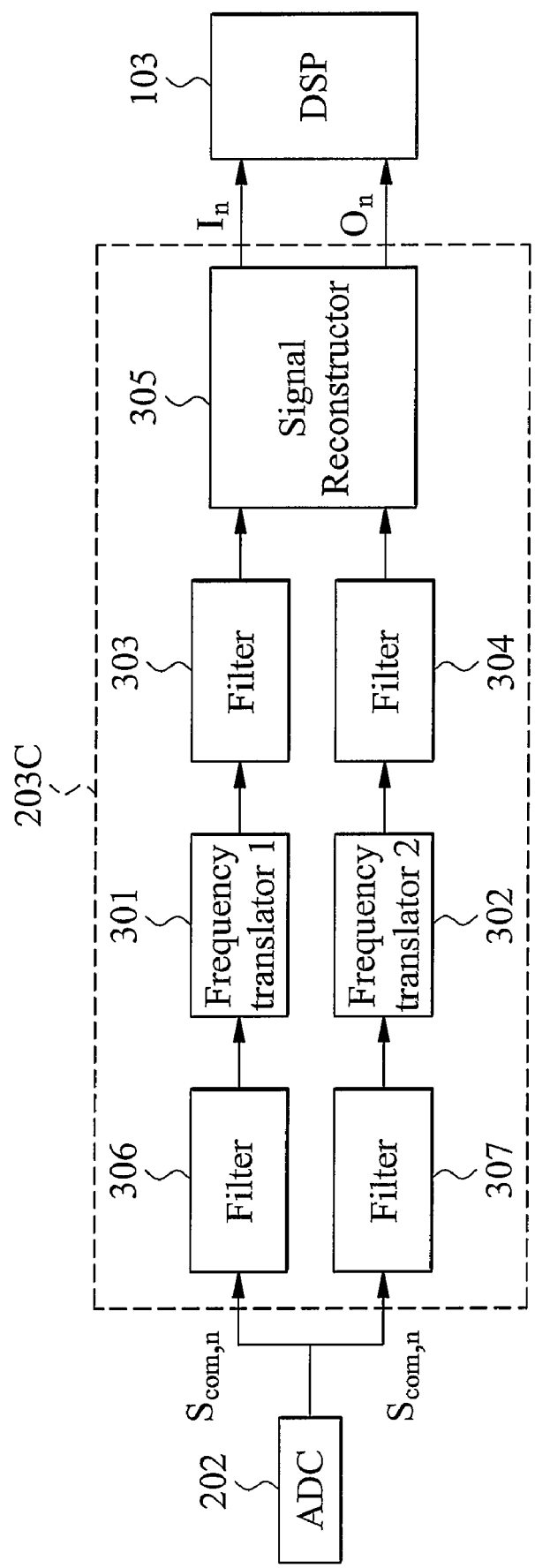
FIG. 6 shows another exemplary block diagram of a signal separator with two stage filters according to the embodiment of invention.
Figure 7:
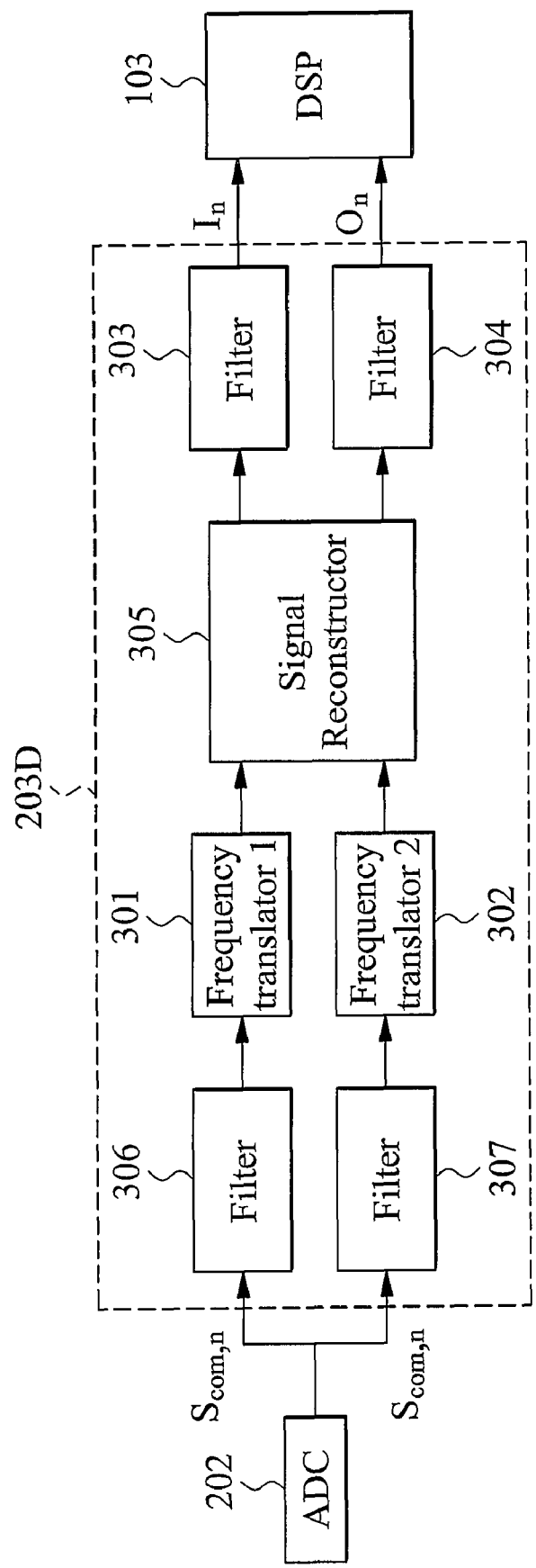
FIG. 7 shows another exemplary block diagram of a signal separator with two stage filters according to the embodiment of invention.
Figure 8:
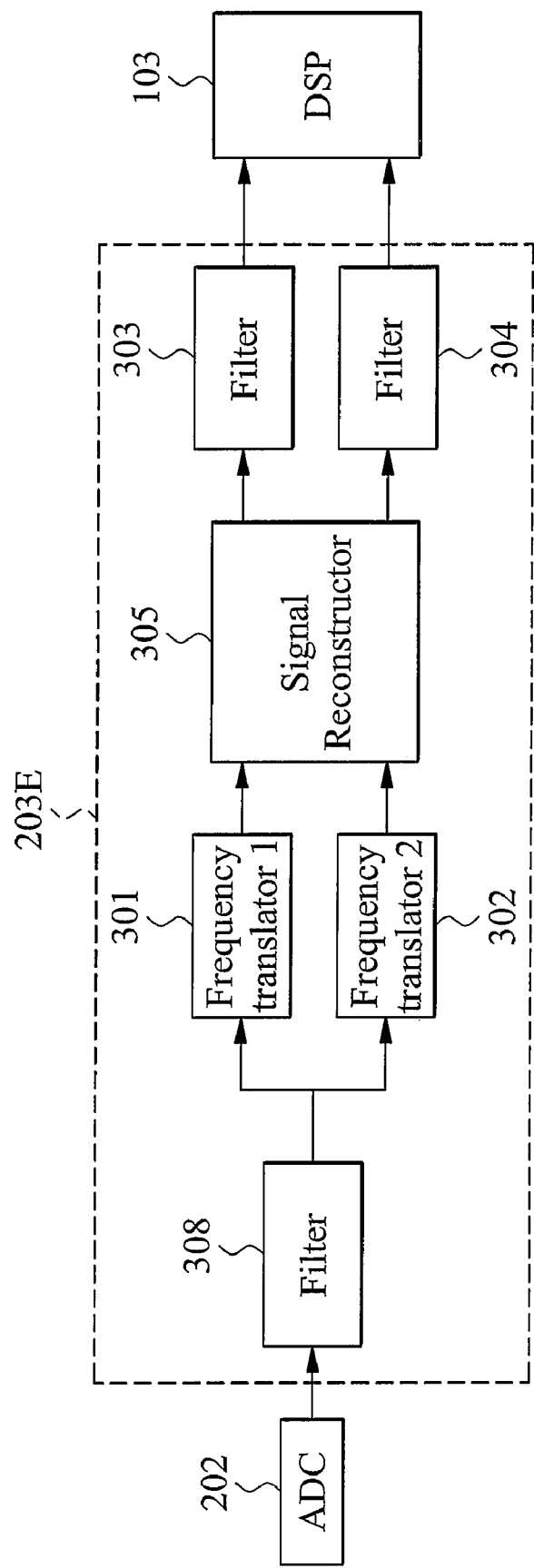
FIG. 8 shows another exemplary block diagram of a signal separator with two stage filters according to the embodiment of invention.
Figure 9:
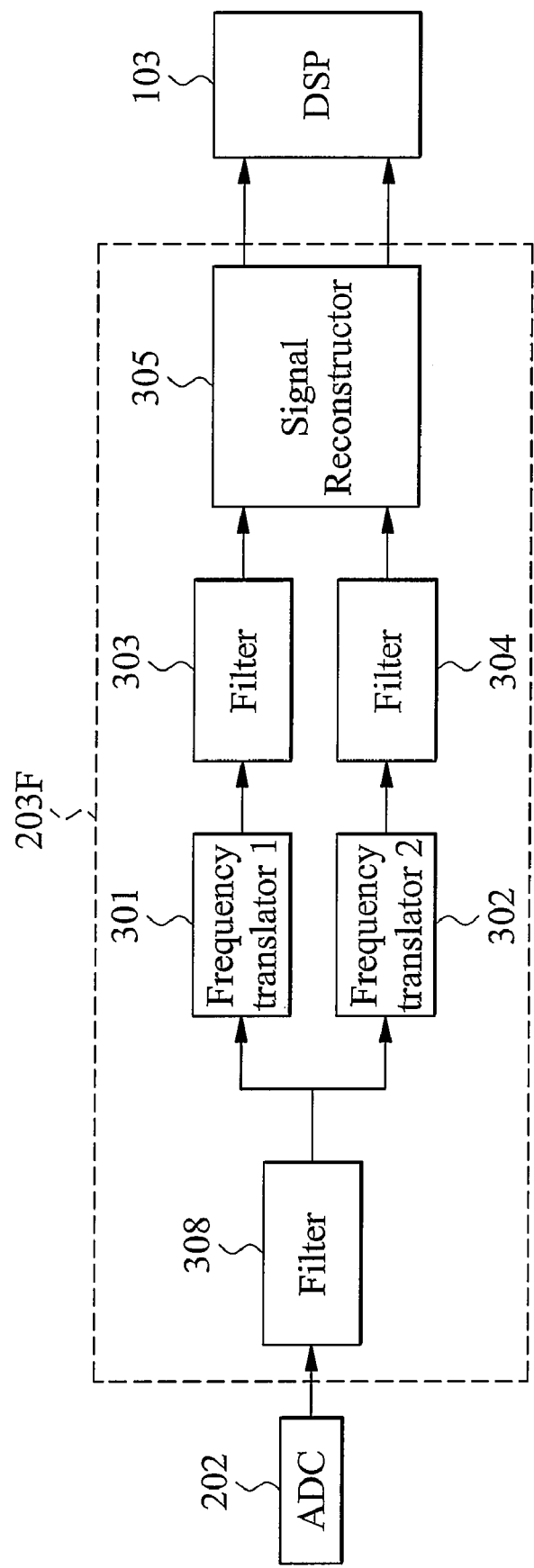
FIG. 9 shows another exemplary block diagram of a signal separator with two stage filters according to the embodiment of invention.

According to another embodiment of the invention, the filters in a signal separator can be implemented via several stages to share each filter's loading. FIG. 6 shows another exemplary block diagram of a signal separator with two stage filters according to the embodiment of invention. As can be seen, the exemplary signal separator 203C is similar to the exemplary signal separator 203A shown in FIG. 3, but with two more filters 306 and 307 disposed before the frequency translators 301 and 302. The filters 306 and 307 can be designed as low pass filters to share the loading of the filters 303 and 304. Thus, the filters 306 and 307 can be designed with wider bandwidth when compared to the filters 303 and 304, and the filters 303 and 304 can be designed with narrower bandwidth to filter out the unwanted high frequency components of the translated signals outputted from the frequency translators. Furthermore, the filters 303 and 304 can be designed with narrower bandwidth to also filter out the unwanted adjacent channel interference (ACI) distributed from the adjacent channel. In addition, as mentioned above, the process order of frequency translating, filtering, and signal construction can be varied while achieving the same results and the invention is not limited thereto. FIG. 7 shows another exemplary block diagram of a signal separator with two stage filters according to the embodiment of invention. The exemplary signal separator 203D is similar to the exemplary signal separator 203C shown in FIG. 6, but the process order between the signal reconstructor 305 and filters 303 and 304 has been changed. Because the signal separation results will not be affected by changing the process order between the signal reconstructor and the filters, a detailed signal processing description of the signal separator 203D is omitted for brevity. It should also be noted that since the filters 306 and 307 both receive the same digital combined signal $S_{com,n}$ from the ADC 202, the filters 306 and 307 shown in FIG. 6 and FIG. 7 can further be combined into one filter 308, as shown in FIG. 8 and FIG. 9, and the invention is not limited thereto.

Figure 10:
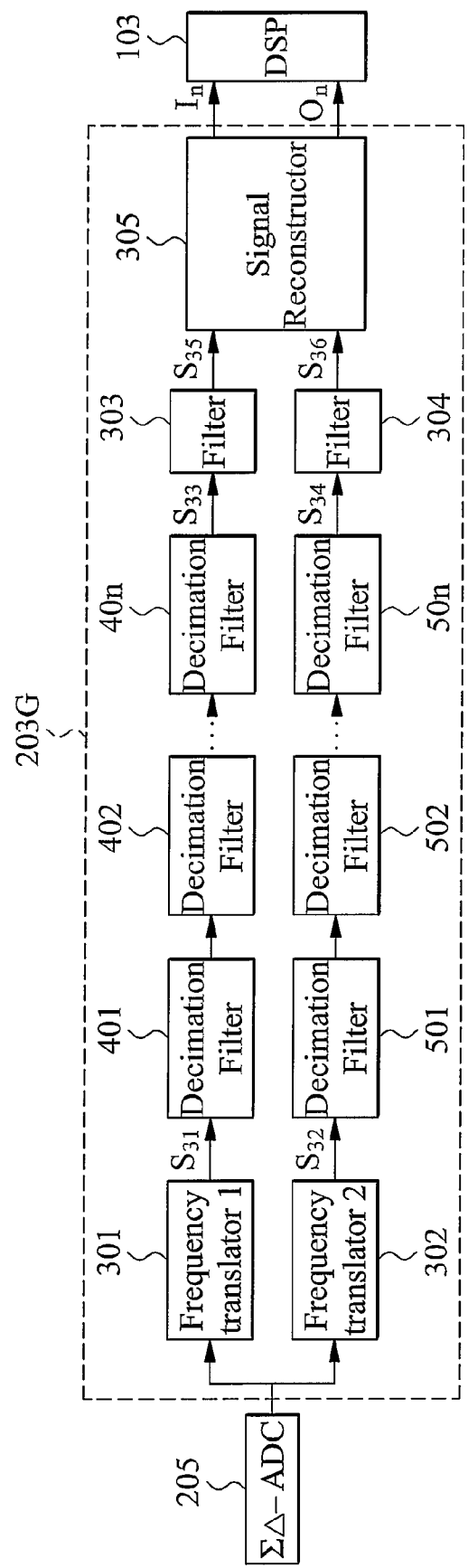
FIG. 10 shows another exemplary block diagram of a signal separator with a sigma-delta ADC according to the embodiment of invention.

According to another embodiment of the invention, the ADC 202 can also be implemented as a sigma-delta ADC. It is known in the art that the resolution (sampling rate) of the output signal of a sigma-delta ADC is usually higher than the conventional ADC due to the noise shaping process. The sampling rate of the signal outputted from a sigma-delta ADC is usually several times (such as 10-20 times) that of the sampling rate required by the DSP module 103. Thus, when the ADC is a sigma-delta ADC, the signal separator should further decimate the data on the first signal processing path and the second signal processing path, respectively, to decrease the resolution of the digital combined signal to a predetermined resolution required by the DSP module 103. FIG. 10 shows another exemplary block diagram of a signal separator with a sigma-delta ADC 205 according to the embodiment of invention. As shown in FIG. 10, the signal separator 203G further comprises a plurality of first decimation filters 401, 402, . . . 40n on the first signal processing path and a plurality of second decimation filters 501, 502, . . . 50n on the second signal processing path. After the frequency translator 301 translates the digital combined signal $S_{com,n}$ into a first translated signal $S_{31}$, the first decimation filters 401, 402, . . . 40n decimates the first translated signal $S_{31}$ and outputs a first decimated signal $S_{33}$, wherein the first decimated signal comprises first high frequency components and a first baseband component carried in the zero frequency, and the first decimated signal is with a second resolution lower than a first resolution of the digital combined signal. Similarly, after the frequency translator 302 translates the digital combined signal $S_{com,n}$ into a second translated signal $S_{32}$, the second decimation filters 501, 502, . . . 50n decimates the second translated signal $S_{32}$ and outputs a second decimated signal $S_{34}$, wherein the second decimated signal comprises second high frequency components and a second baseband component carried in the zero frequency, and the second decimated signal is with the second resolution lower than the first resolution. Next, the filter 303 receives the first decimated signal $S_{33}$, filters out the first high frequency components, and outputs a first filtered signal $S_{35}$ comprising the first baseband component. The filter 304 receives the second decimated signal $S_{34}$, filters out the second high frequency components, and outputs a second filtered signal $S_{36}$ comprising the second baseband component. Finally, the signal reconstructor 305 generates the digital baseband inphase signal $I_n$ and the digital baseband quadrature phase signal $Q_n$ according to the first filtered signal $S_{35}$ and the second filtered signal $S_{36}$.

Figure 11:
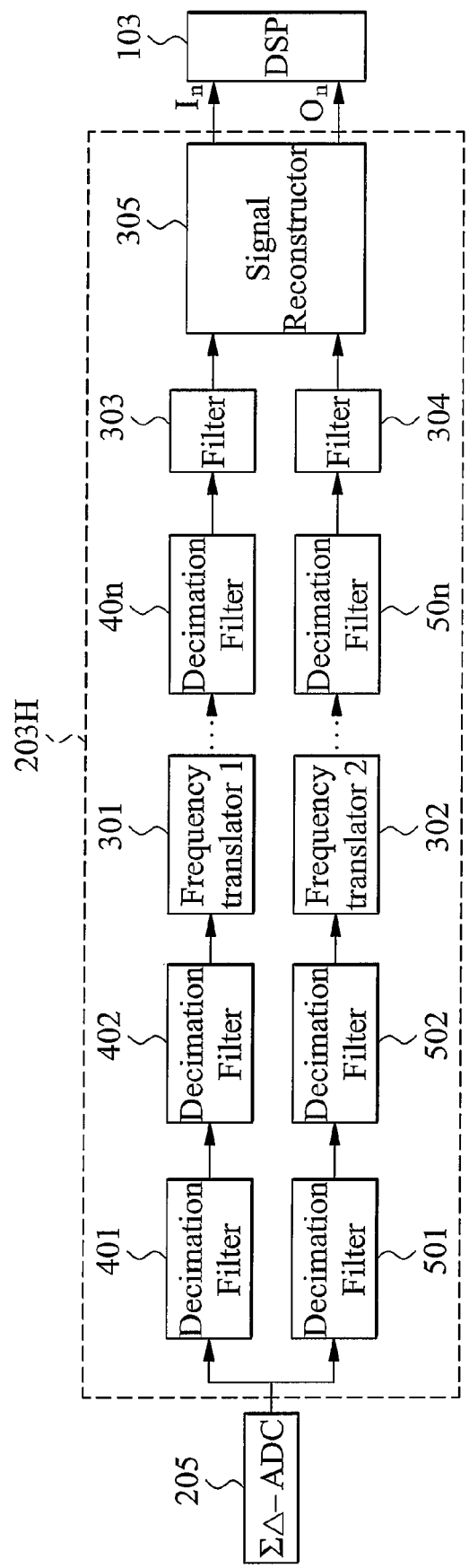
FIG. 11 shows another exemplary block diagram of a signal separator with a sigma-delta ADC according to the embodiment of invention.

As mentioned above, it should be noted that the process order of frequency translating, filtering, and signal construction can be varied while achieving the same results and the invention is not limited thereto. Thus, the process order between the signal reconstructor 305 and the filters 303 and 304 can be changed as the embodiment shown in FIG. 5 and the invention should not be limited thereto. In addition, the process order between the frequency translators 301 and 302 and the decimation filters can also be changed. The frequency translators 301 and 302 can be disposed before, between, or after the series of first decimation filters 401, 402, . . . 40n and the series of second decimation filters 501, 502, . . . 50n and the invention should not be limited thereto. FIG. 11 shows another exemplary block diagram of a signal separator with a sigma-delta ADC 205 according to the embodiment of invention. Because the signal separation results will not be affected by changing the process order between the frequency translators and the decimation filters, a detailed signal processing description of the signal separator 203H is omitted for brevity.

Referring back to FIG. 1, according to another embodiment of the invention, the signal separator 203 separates the digital combined signal by diverging the digital combined signal to a first signal processing path and a second signal processing path, and frequency translating and filtering a plurality of data on the first signal processing path and the second signal processing path, respectively, to obtain the digital baseband inphase signal and the digital baseband quadrature phase signal. Frequency translation in the first signal processing path is performed according to a first composite signal, and frequency translation in the second signal processing path is performed according to a second composite signal, wherein the first composite signal comprises a sum of a first reference signal and a second reference signal, and the second composite signal comprises a difference of the first reference signal and the second reference signal. According to an embodiment of the invention, the first reference signal and the second reference signal are orthogonal to each other. According to another embodiment of the invention, the first reference signal and the second reference signal are carried in the predetermined intermediate frequency.

Figure 12:
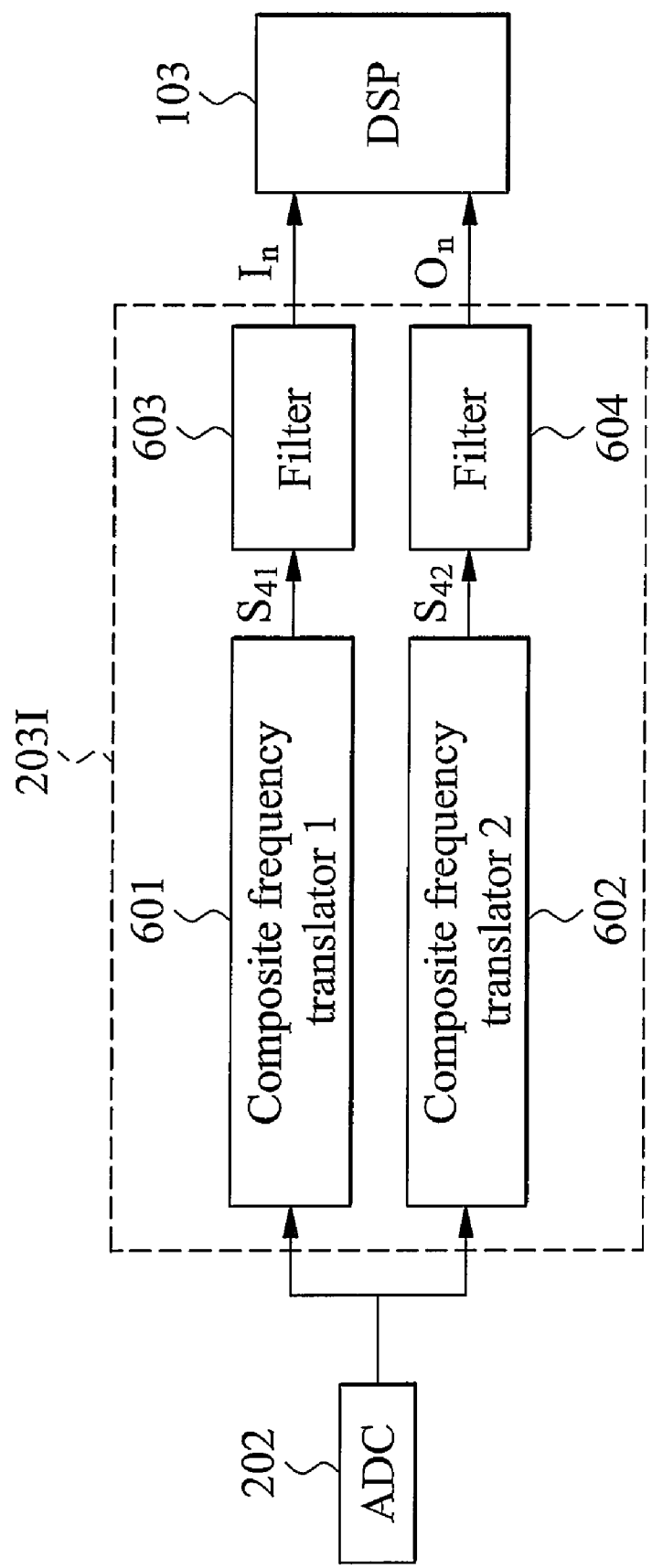
FIG. 12 shows an exemplary block diagram of a signal separator according to another embodiment of invention.
Figure 13A:
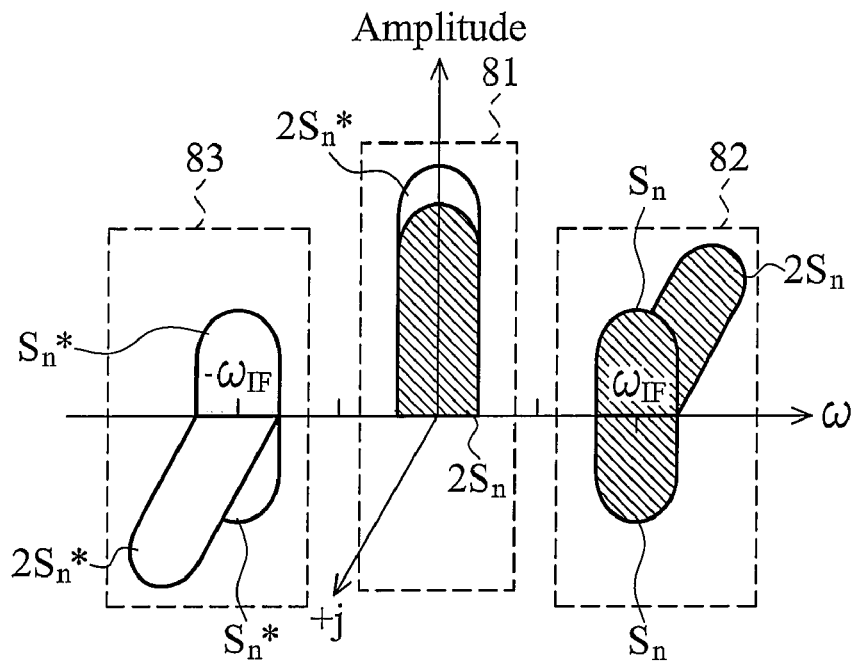
FIG. 13A shows the spectrum of a first translated signal $S_{41}$ according to another embodiment of invention.
Figure 13B:
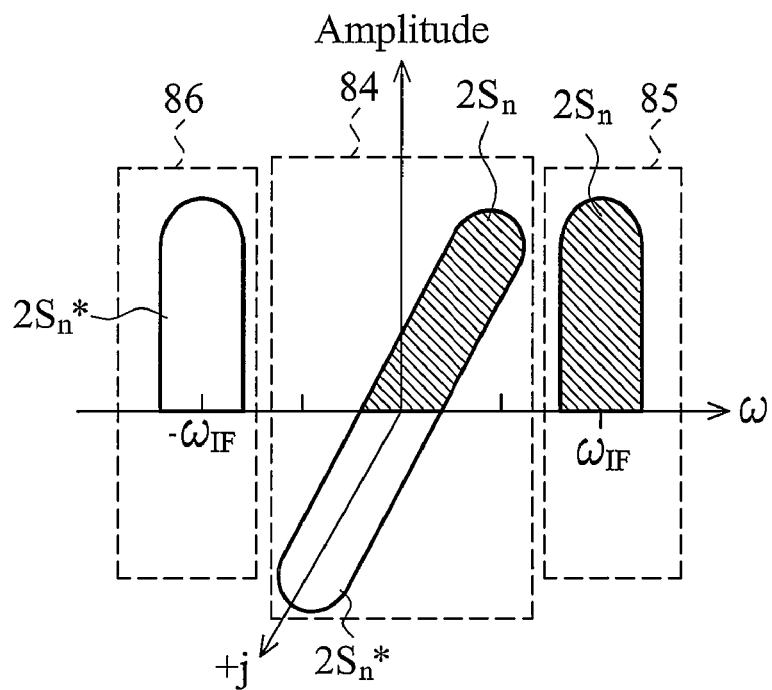
FIG. 13B shows the spectrum of a second translated signal $S_{42}$ according to another embodiment of invention.

FIG. 12 shows an exemplary block diagram of a signal separator 203I according to another embodiment of invention. As shown in FIG. 12, a first composite frequency translator 601 translates the digital combined signal $S_{com,n}$ into a first translated signal $S_{41}$ according to a first composite signal, and a second composite frequency translator 602 translates the digital combined signal $S_{com,n}$ into a second translated signal $S_{42}$ according to a second composite signal. FIGS. 13A-13B respectively show the spectrums of first translated signal $S_{41}$ and the second translated signal $S_{42}$ according to the embodiment of invention. According to the embodiment, since the first composite signal comprises a sum of a first reference signal and a second reference signal and the second composite signal comprises a difference of the first reference signal and the second reference signal, the spectrum of the first translated signal $S_{41}$ can be derived from the combination of the spectrums shown in FIG. 4A and FIG. 4B, and the spectrum of the second translated signal $S_{42}$ can be derived from the difference of the spectrums shown in FIG. 4A and FIG. 4B. As can be seen from FIG. 13A, the first translated signal $S_{41}$ comprises first high frequency components 82 and 83 and the first baseband component 81, and the second translated signal $S_{42}$ comprises second high frequency components 85 and 86 and the second baseband component 84. Apparently, the digital baseband inphase signal $I_n$ can be obtained from the baseband component 81 as shown in Eq. (2), and the digital baseband quadrature phase signal $Q_n$ can be obtained from the baseband component 84 as shown in Eq. (3). Next, the filter 603 simply receives the first translated signal $S_{41}$, filters out the first high frequency components 82 and 83, and outputs the digital baseband inphase signal $I_n$. Similarly, the filter 604 receives the second translated signal $S_{42}$, filters out the second high frequency components 85 and 86, and outputs the digital baseband quadrature phase signal $Q_n$.

Figure 14:
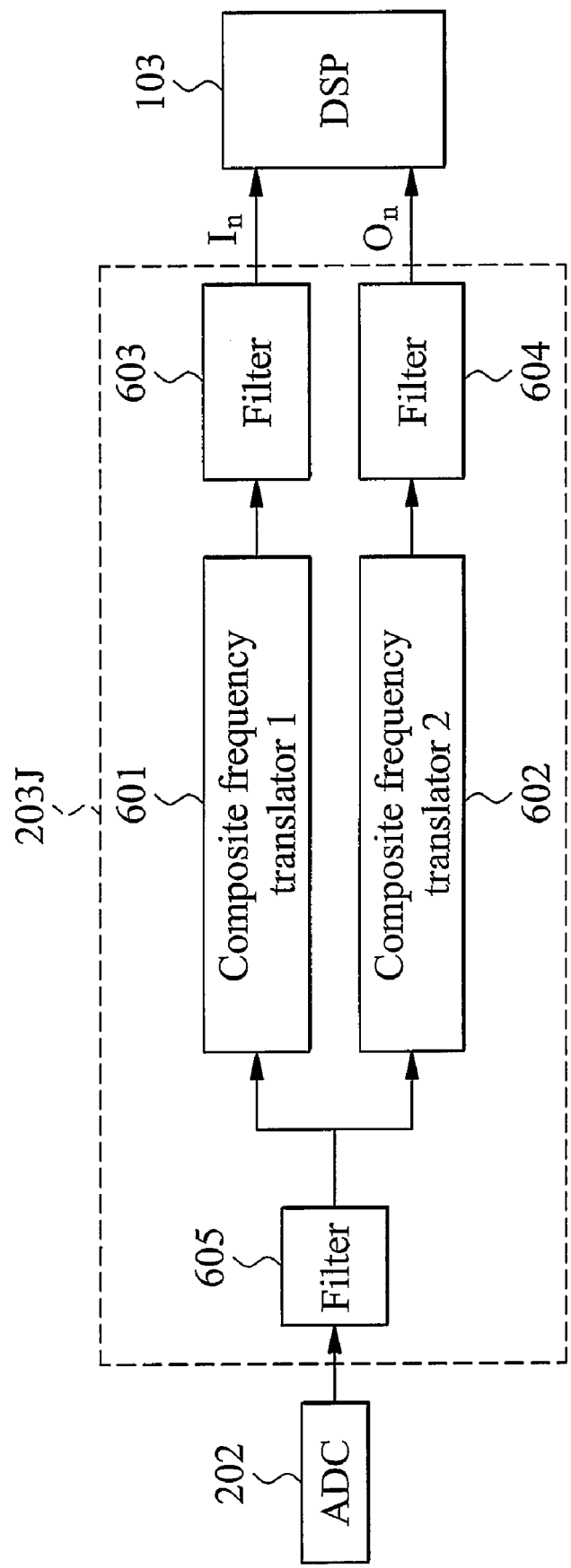
FIG. 14 shows an exemplary block diagram of a signal separator according to another embodiment of invention.

FIG. 14 shows an exemplary block diagram of a signal separator according to another embodiment of invention. As shown in FIG. 14, the signal separator 203J further comprises a filter 605 disposed before the composite frequency translators 601 and 602 to share the loading of filters 603 and 604. According to the embodiment of the invention, the filter 605 can be designed as a wider bandwidth low pass filter when compared to the filters 603 and 604, and the filters 603 and 604 can be designed as narrower bandwidth low pass filters to filter out the unwanted high frequency components of the translated signals outputted from the composite frequency translators and the adjacent channel interference. Since the signal separation results will not be affected by adding the filter 605, then the signal processing process of the signal separator 203J is similar to the signal separator 203I, and is omitted for brevity.

Figure 15:
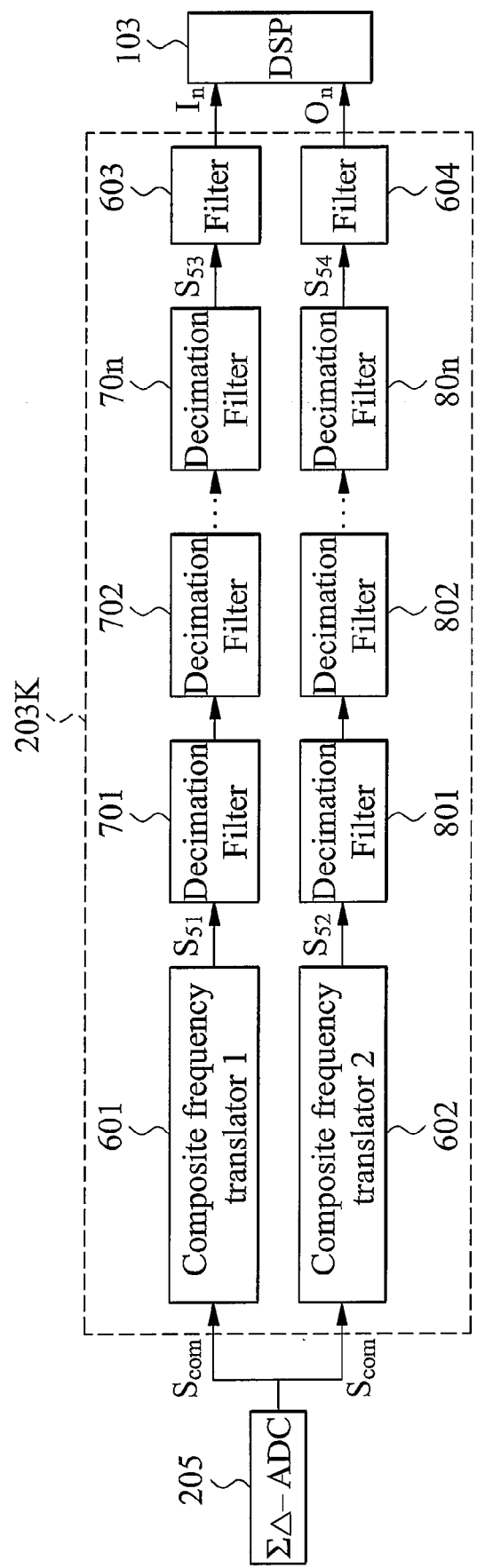
FIG. 15 shows another exemplary block diagram of a signal separator with a sigma-delta ADC according to the embodiment of invention.
Figure 16:
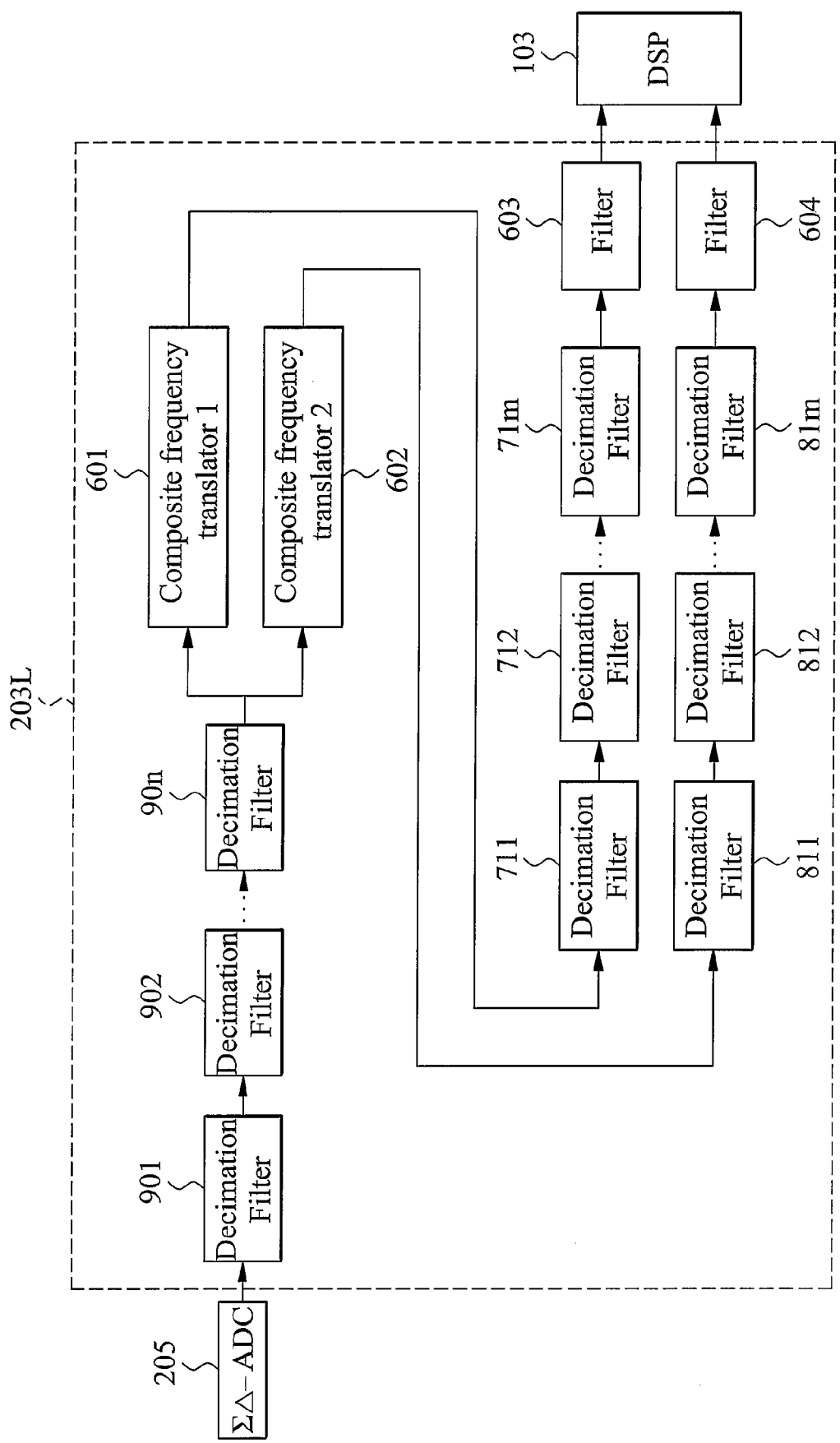
FIG. 16 shows another exemplary block diagram of a signal separator with a sigma-delta ADC according to the embodiment of invention.

According to another embodiment of the invention, when the ADC 202 is a sigma-delta ADC, the signal separator further decimates the data on the first signal processing path and the second signal processing path, respectively, to decrease the resolution of the digital combined signal. FIG. 15 shows another exemplary block diagram of a signal separator with a sigma-delta ADC 205 according to the embodiment of invention. As shown in FIG. 15, the signal separator 203K further comprises a plurality of first decimation filters 701, 702 to 70n on the first signal processing path and a plurality of second decimation filters 801, 802 to 80n on the second signal processing path. After the composite frequency translator 601 translates the digital combined signal $S_{com,n}$ into a first translated signal $S_{51}$, the first decimation filters 701, 702 to 70n decimates the first translated signal $S_{51}$ and outputs a first decimated signal $S_{53}$, wherein the first decimated signal comprises first high frequency components and a first baseband component carried in the zero frequency, and the first decimated signal is with a second resolution lower than a first resolution of the digital combined signal. Similarly, after the composite frequency translator 602 translates the digital combined signal $S_{com,n}$ into a second translated signal $S_{52}$, the second decimation filters 801, 802 to 80n decimates the second translated signal $S_{52}$ and outputs a second decimated signal $S_{54}$, wherein the second decimated signal comprises second high frequency components and a second baseband component carried in the zero frequency, and the second translated signal is with the second resolution lower than the first resolution. Next, the filter 603 receives the first decimated signal $S_{53}$, filters out the first high frequency component, and outputs the digital baseband inphase signal $I_n$. The filter 604 receives the second decimated signal $S_{54}$, filters out the second high frequency component, and outputs the digital baseband quadrature phase signal $Q_n$. FIG. 16 shows another exemplary block diagram of a signal separator with a sigma-delta ADC according to the embodiment of invention. As shown in FIG. 16, the signal separator 203L comprises a plurality of decimation filters 901, 902 to 90n disposed before the composite frequency translators 601 and 602, a plurality of decimation filters 711, 712 to 71m disposed between the composite frequency translator 601 and the filter 603, and a plurality of decimation filters 811, 812 to 81m disposed between the composite frequency translator 602 and the filter 604. The multi-stage decimation filters 901, 902 to 90n are added to share the loading of decimation filters 711, 712 to 71m and 811, 812 to 81m. It should be understood that the signal processing process of the signal separator 203L is similar to the signal separator 203K and is omitted for brevity.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A signal converter for converting an analog inphase signal and an analog quadrature phase signal into a digital baseband inphase signal and a digital baseband quadrature phase signal, wherein the analog inphase signal and the analog quadrature phase signal are orthogonal to each other and are carried in a predetermined intermediate frequency, and the digital baseband inphase signal and the digital baseband quadrature phase signal are carried in zero frequency, comprising:

a signal combiner combining frequency component(s) of the analog inphase signal and frequency component(s) of the analog quadrature phase signal to obtain an analog combined signal;

an analog to digital converter converting the analog combined signal to a digital combined signal; and a signal separator separating frequency components of the digital combined signal by frequency translating and filtering the digital combined signal to obtain the digital baseband inphase signal and the digital baseband quadrature phase signal.

2. The signal converter as claimed in claim 1, wherein the analog inphase signal and the analog quadrature phase signal are received from a radio frequency signal processor for processing an analog radio frequency signal received from an antenna to obtain the analog inphase signal and the analog quadrature phase signal, wherein the analog radio frequency signal is carried in a predetermined radio frequency higher than the predetermined intermediate frequency.

3. The signal converter as claimed in claim 1, wherein the signal combiner is an adder directly adding the analog inphase signal and the analog quadrature phase signal to obtain the analog combined signal.

4. The signal converter as claimed in claim 1, wherein the signal separator separates the digital combined signal by diverging the digital combined signal to a first signal processing path and a second signal processing path, frequency translating and filtering the digital combined signal on the first signal processing path and the second signal processing path, respectively, and combining a plurality of data on the first signal processing path and the second signal processing path to obtain the digital baseband inphase signal and the digital baseband quadrature phase signal.

5. The signal converter as claimed in claim 4, wherein the frequency translation in the first signal processing path is performed according to a first reference signal, and the frequency translation in the second signal processing path is performed according to a second reference signal, wherein the first reference signal and the second reference signal are orthogonal to each other.

6. The signal converter as claimed in claim 4, wherein the frequency translation in the first signal processing path is performed according to a first reference signal, and the frequency translation in the second signal processing path is performed according to a second reference signal, wherein the first reference signal and the second reference signal are carried in the predetermined intermediate frequency.

7. The signal converter as claimed in claim 4, wherein when the analog to digital converter is a sigma-delta analog to digital converter, the signal separator further decimates the data on the first signal processing path and the second signal processing path, respectively, to decrease a first resolution of the digital combined signal.

8. The signal converter as claimed in claim 7, wherein the signal separator comprises:

a first frequency translator frequency translating the digital combined signal into a first translated signal;

a second frequency translator frequency translating the digital combined signal into a second translated signal;

a plurality of first decimation filters decimating the first translated signal and outputting a first decimated signal, wherein the first decimated signal comprises a first high frequency component and a first baseband component carried in the zero frequency, and is with a second resolution lower than the first resolution;

a plurality of second decimation filters decimating the second translated signal and outputting a second decimated signal, wherein the second decimated signal comprises a second high frequency component and a second baseband component carried in the zero frequency, and is with the second resolution;

a first filter receiving the first decimated signal, filtering out the first high frequency component, and outputting a first filtered signal comprising the first baseband component;

a second filter receiving the second decimated signal, filtering out the second high frequency component, and outputting a second filtered signal comprising the second baseband component; and a signal reconstructor generating the digital baseband inphase signal and the digital baseband quadrature phase signal according to the first filtered signal and the second filtered signal.

9. The signal converter as claimed in claim 7, wherein the signal separator comprises:

a plurality of first decimation filters decimating the digital combined signal and outputting a first decimated signal, wherein the first decimated signal is with a second resolution lower than the first resolution;

a plurality of second decimation filters decimating the digital combined signal and outputting a second decimated signal, wherein the second decimated signal is with the second resolution;

a first frequency translator frequency translating the first decimated signal into a first translated signal;

a second frequency translator frequency translating second first decimated signal into a second translated signal;

a plurality of third decimation filters decimating the first translated signal and outputting a third decimated signal, wherein the third decimated signal comprises a first high frequency component and a first baseband component carried in the zero frequency, and is with a third resolution lower than the second resolution;

a plurality of fourth decimation filters decimating the second translated signal and outputting a fourth decimated signal, wherein the fourth decimated signal comprises a second high frequency component and a second baseband component carried in the zero frequency, and is with the third resolution;

a first filter receiving the third decimated signal, filtering out the first high frequency component, and outputting a first filtered signal comprising the first baseband component;

a second filter receiving the fourth decimated signal, filtering out the second high frequency component, and outputting a second filtered signal comprising the second baseband component; and a signal reconstructor generating the digital baseband inphase signal and the digital baseband quadrature phase signal according to the first filtered signal and the second filtered signal.

10. The signal converter as claimed in claim 4, wherein the signal separator comprises:

a first frequency translator frequency translating the digital combined signal into a first translated signal, wherein the first translated signal comprises a first high frequency component and a first baseband component carried in the zero frequency;

a second frequency translator frequency translating the digital combined signal into a second translated signal, wherein the second translated signal comprises a second high frequency component and a second baseband component carried in the zero frequency;

a first filter receiving the first translated signal, filtering out the first high frequency component, and outputting a first filtered signal comprising the first baseband component;

a second filter receiving the second translated signal, filtering out the second high frequency component, and outputting a second filtered signal comprising the second baseband component; and a signal reconstructor generating the digital baseband inphase signal and the digital baseband quadrature phase signal according to the first filtered signal and the second filtered signal.

11. The signal converter as claimed in claim 4, wherein the signal separator comprises:

a first frequency translator frequency translating the digital combined signal into a first translated signal;

a second frequency translator frequency translating the digital combined signal into a second translated signal;

a signal reconstructor generating a first reconstructed signal and a second reconstructed signal according to the first translated signal and the second translated signal, wherein the first reconstructed signal comprises a first high frequency component and a first baseband component carried in the zero frequency, and the second reconstructed signal comprises a second high frequency component and a second baseband component carried in the zero frequency;

a first filter receiving the first reconstructed signal, filtering out the first high frequency component, and outputting the digital baseband inphase signal according to the first baseband component; and a second filter receiving the second reconstructed signal, filtering out the second high frequency component, and outputting the digital baseband quadrature phase signal according to the second baseband component.

12. The signal converter as claimed in claim 4, wherein the signal separator comprises:

a first filter filtering the digital combined signal, and outputting a first filtered signal;

a second filter filtering the digital combined signal, and outputting a second filtered signal;

a first frequency translator frequency translating the first filtered signal into a first translated signal, wherein the first translated signal comprises a first high frequency component and a first baseband component carried in the zero frequency;

a second frequency translator frequency translating the second filtered signal into a second translated signal, wherein the second translated signal comprises a second high frequency component and a second baseband component carried in the zero frequency;

a third filter receiving the first translated signal, filtering out the first high frequency component, and outputting a third filtered signal comprising the first baseband component;

a fourth filter receiving the second translated signal, filtering out the second high frequency component, and outputting a fourth filtered signal comprising the second baseband component; and a signal reconstructor generating the digital baseband inphase signal and the digital baseband quadrature phase signal according to the third filtered signal and the fourth filtered signal.

13. The signal converter as claimed in claim 4, wherein the signal separator comprises:

a first filter filtering the digital combined signal, and outputting a first filtered signal;

a second filter filtering the digital combined signal, and outputting a second filtered signal;

a first frequency translator frequency translating the first filtered signal into a first translated signal;

a second frequency translator frequency translating the second filtered signal into a second translated signal;

a signal reconstructor generating a first reconstructed signal and a second reconstructed signal according to the first translated signal and the second translated signal, wherein the first reconstructed signal comprises a first high frequency component and a first baseband component carried in the zero frequency, and the second reconstructed signal comprises a second high frequency component and a second baseband component carried in the zero frequency;

a third filter receiving the first reconstructed signal, filtering out the first high frequency component, and outputting the digital baseband inphase signal according to the first baseband component; and a fourth filter receiving the second reconstructed signal, filtering out the second high frequency component, and outputting the digital baseband quadrature phase signal according to the second baseband component.

14. The signal converter as claimed in claim 4, wherein the signal separator comprises:

a first filter filtering the digital combined signal, and outputting a first filtered signal;

a first frequency translator frequency translating the first filtered signal into a first translated signal;

a second frequency translator frequency translating the first filtered signal into a second translated signal;

a signal reconstructor generating a first reconstructed signal and a second reconstructed signal according to the first translated signal and the second translated signal, wherein the first reconstructed signal comprises a first high frequency component and a first baseband component carried in the zero frequency, and the second reconstructed signal comprises a second high frequency component and a second baseband component carried in the zero frequency;

a second filter receiving the first reconstructed signal, filtering out the first high frequency component, and outputting the digital baseband inphase signal according to the first baseband component; and a third filter receiving the second reconstructed signal, filtering out the second high frequency component, and outputting the digital baseband quadrature phase signal according to the second baseband component.

15. The signal converter as claimed in claim 4, wherein the signal separator comprises:

a first filter filtering the digital combined signal, and outputting a first filtered signal;

a first frequency translator frequency translating the first filtered signal into a first translated signal, wherein the first translated signal comprises a first high frequency component and a first baseband component carried in the zero frequency;

a second frequency translator frequency translating the first filtered signal into a second translated signal, wherein the second translated signal comprises a second high frequency component and a second baseband component carried in the zero frequency;

a second filter receiving the first translated signal, filtering out the first high frequency component, and outputting a second filtered signal comprising the first baseband component;

a third filter receiving the second translated signal, filtering out the second high frequency component, and outputting a third filtered signal comprising the second baseband component; and a signal reconstructor generating the digital baseband inphase signal and the digital baseband quadrature phase signal according to the second filtered signal and the third filtered signal.

16. The signal converter as claimed in claim 1, wherein the signal separator separates the digital combined signal by diverging the digital combined signal to a first signal processing path and a second signal processing path, frequency translating and filtering a plurality of data on the first signal processing path and the second signal processing path, respectively, to obtain the digital baseband inphase signal and the digital baseband quadrature phase signal.

17. The signal converter as claimed in claim 16, wherein the frequency translation in the first signal processing path is performed according to a first composite signal, and frequency translation in the second signal processing path is performed according to a second composite signal, and wherein the first composite signal comprises a sum of a first reference signal and a second reference signal, and the second composite signal comprises a difference of the first reference signal and the second reference signal.

18. The signal converter as claimed in claim 17, wherein the first reference signal and the second reference signal are orthogonal to each other.

19. The signal converter as claimed in claim 17, wherein the first reference signal and the second reference signal are carried in the predetermined intermediate frequency.

20. The signal converter as claimed in claim 16, wherein when the analog to digital converter is a sigma-delta analog to digital converter, the signal separator further decimates the data on the first signal processing path and the second signal processing path, respectively, to decrease a first resolution of the digital combined signal.

21. The signal converter as claimed in claim 20, wherein the signal separator comprises:

a first composite frequency translator frequency translating the digital combined signal into a first translated signal;

a second composite frequency translator frequency translating the digital combined signal into a second translated signal;

a plurality of first decimation filters decimating the first translated signal and outputting a first decimated signal, wherein the first decimated signal is with a second resolution lower than the first resolution, and wherein the first decimated signal comprises a first high frequency component and the digital baseband inphase signal;

a plurality of second decimation filters decimating the second translated signal and outputting a second decimated signal, wherein the second decimated signal is with the second resolution, and wherein the second decimated signal comprises a second high frequency component and the digital baseband quadrature phase signal;

a first filter receiving the first decimated signal, filtering out the first high frequency component, and outputting the digital baseband inphase signal; and a second filter receiving the second decimated signal, filtering out the second high frequency component, and outputting the digital baseband quadrature phase signal.

22. The signal converter as claimed in claim 20, wherein the signal separator comprises:

a plurality of first decimation filters decimating the digital combined signal and outputting a first decimated signal, wherein the first decimated signal is with a second resolution lower than the first resolution;

a first composite frequency translator frequency translating the first decimated signal into a first translated signal;

a second composite frequency translator frequency translating the first decimated signal into a second translated signal;

a plurality of second decimation filters decimating the first translated signal and outputting a second decimated signal, wherein the second decimated signal is with a third resolution lower than the second resolution, and wherein the second decimated signal comprises a first high frequency component and the digital baseband inphase signal;

a plurality of third decimation filters decimating the second translated signal and outputting a third decimated signal, wherein the third decimated signal is with the third resolution, and wherein the second decimated signal comprises a second high frequency component and the digital baseband quadrature phase signal;

a first filter receiving the second decimated signal, filtering out the first high frequency component, and outputting the digital baseband inphase signal; and a second filter receiving the third decimated signal, filtering out the second high frequency component, and outputting the digital baseband quadrature phase signal.

23. The signal converter as claimed in claim 16, wherein the signal separator comprises:

a first composite frequency translator frequency translating the digital combined signal into a first translated signal, wherein the first translated signal comprises a first high frequency component and the digital baseband inphase signal;

a second composite frequency translator frequency translating the digital combined signal into a second translated signal, wherein the second translated signal comprises a second high frequency component and the digital baseband quadrature phase signal;

a first filter receiving the first translated signal, filtering out the first high frequency component, and outputting the digital baseband inphase signal; and a second filter receiving the second translated signal, filtering out the second high frequency component, and outputting the digital baseband quadrature phase signal.

24. The signal converter as claimed in claim 16, wherein the signal separator comprises:

a first filter receiving and filtering the digital combined signal, and outputting a first filtered signal;

a first composite frequency translator frequency translating the first filtered signal into a first translated signal, wherein the first translated signal comprises a first high frequency component and the digital baseband inphase signal;

a second composite frequency translator frequency translating the first filtered signal into a second translated signal, wherein the second translated signal comprises a second high frequency component and the digital baseband quadrature phase signal;

a second filter receiving the first translated signal, filtering out the first high frequency component, and outputting the digital baseband inphase signal; and a third filter receiving the second translated signal, filtering out the second high frequency component, and outputting the digital baseband quadrature phase signal.

* * * * *